C. Phelps.
Elastic Mane Turner.

No. 110,068.        Patented Dec. 13, 1870.

Witnesses,
Henry M. Slade
Gilbert B. Fowles

Inventor,
C. Phelps
By W. Burris Attorney

United States Patent Office.

CHAMBERLAYNE PHELPS, OF CLAYTON, NEW YORK.

Letters Patent No. 110,068, dated December 13, 1870.

IMPROVEMENT IN ELASTIC MANE-TURNERS.

The Schedule referred to in these Letters Patent and making part of the same.

*To all whom it may concern:*

Be it known that I, CHAMBERLAYNE PHELPS, of the town of Clayton, county of Jefferson and State of New York, have invented a new and useful "Elastic Mane-Turner and Adjuster;" and I declare that the following is a clear, full, and exact description of the same, reference being had to the accompanying drawing, in which like letters in the different figures represent like parts of the invention, and in which—

Nature.

My invention is a device for adjusting and keeping in place a horse's mane; and consists of two elastic cords provided with metallic holders for attaching the cords to the harness, and with rings or loops for holding the mane in proper position between the cords.

Description.

Figure 1:
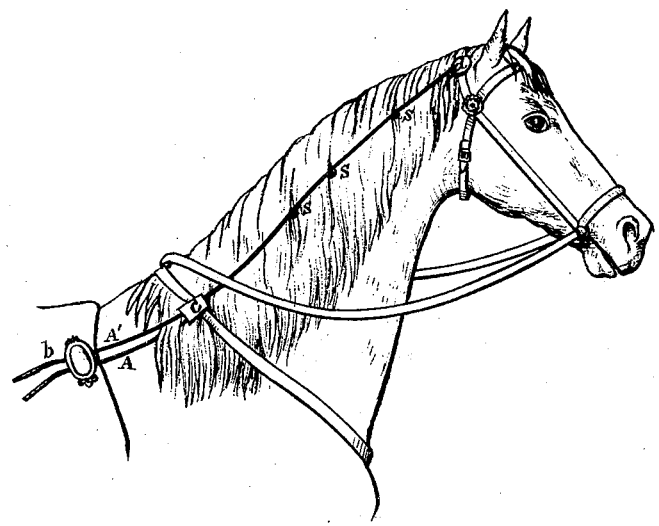
Figure 1 shows the device attached and properly adjusted upon a horse's neck.
Figure 2:
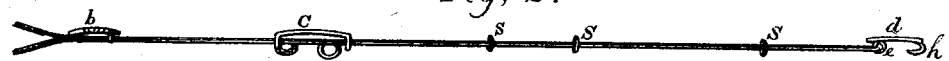
Figure 2 is a side view of the device, detached.
Figure 3:
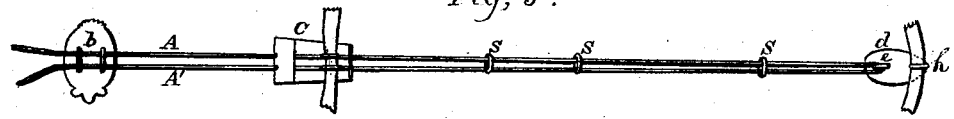
Figure 3 is an under-side view of the device, detached.

A A' are elastic cords, the front ends of which are held in the eye e upon holder d, which is provided with hook h, by which it is attached to and held in place upon the head-stall of the bridle, as seen in fig. 1.

The cords extend along the horse's neck, and are looped around the breast-strap, and are secured and protected there by the holder c, and the back ends, which are provided with metallic tips, are properly adjusted and secured by the holder b.

S S are loops or rings upon the cords, for holding them and the mane in proper position.

The lower cord A is made larger than cord A', for the purpose of securing proper strength with neatness, and the upper cord may be of a color to correspond with the color of the mane, and may also be ornamented by attaching to it tassels or other suitable ornaments, and the whole length or only a part of the cords may be elastic.

In adjusting the mane when the device is attached as shown and described, the upper cord is lifted and a portion of the mane drawn through between the cords and properly adjusted, and a ring slipped up, and so on till the whole mane is properly adjusted, as seen in fig. 1.

Ordinarily, in removing the harness the device is left attached to the harness or saddle, as secured by holders b c, and is detached from the horse by simply unhooking it from the bridle and slipping it off the mane; but it may be left on day and night for a sufficient period when the mane is to be changed from one side to the other.

I contemplate that the cords may be fastened and held in place by being tied to or looped around the head-stall of the bridle and breast-strap, or in any other well-known manner.

Claims.

What I claim, and desire to secure by Letters Patent, is—

1. The adjustment of a horse's mane by means of cords A A', arranged substantially as described and set forth.

2. The mane-turner and adjuster, consisting of the elastic cords A A', proved with holders b c d, and with loops or rings S S, substantially as set forth.

In attestation of the foregoing specifications of my mane-turner and adjuster, I hereunto subscribe my name this 15th day of October, A. D. 1870.

CHAMBERLAYNE PHELPS.

Witnesses:
JAMES JOHNSON,
HORATIO N. ESTES.